United States Patent [19]

Stenkvist

[11] 4,435,813
[45] Mar. 6, 1984

[54] DC ARC FURNACE COMPONENT

[75] Inventor: Sven-Einar Stenkvist, Västerås, Sweden

[73] Assignee: ASEA Aktiebolag, Västerås, Sweden

[21] Appl. No.: 380,442

[22] Filed: May 20, 1982

[30] Foreign Application Priority Data

May 25, 1981 [SE] Sweden ................................. 8103268

[51] Int. Cl.³ .............................................. F27D 1/08
[52] U.S. Cl. ........................................ 373/72; 110/338
[58] Field of Search ............... 110/323, 336, 335, 332, 110/340, 339, 338; 264/30; 165/9.1, 9.4; 373/71, 72, 137, 164, 155, 108

[56] References Cited

U.S. PATENT DOCUMENTS 2,230,142 1/1941 Longacre ............................ 110/338
3,083,453 4/1963 Reynolds et al. .................. 110/340
4,170,856 10/1979 Musser ................................. 110/340

Primary Examiner—Roy N. Envall, Jr.
Attorney, Agent, or Firm—Kenyon & Kenyon

[57] ABSTRACT

A DC arc furnace hearth directly contacted by the melt is made from partially metal cased bricks which provide metal-to-metal intercontact while exposed portions of the bricks provide brick-to-brick intercontact.

4 Claims, 4 Drawing Figures

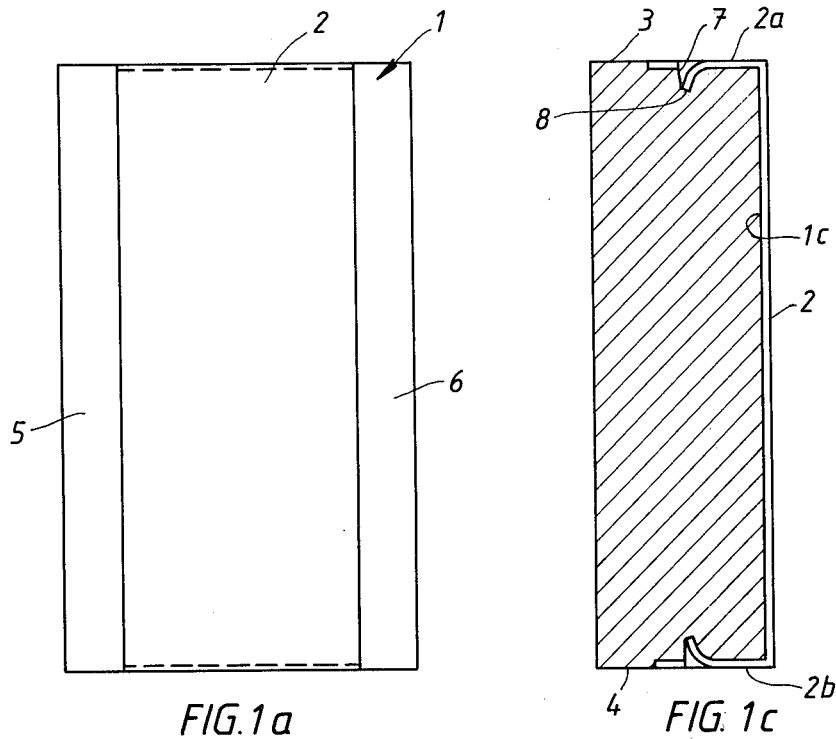
FIG. 1a
FIG. 1b
FIG. 1c
A-A
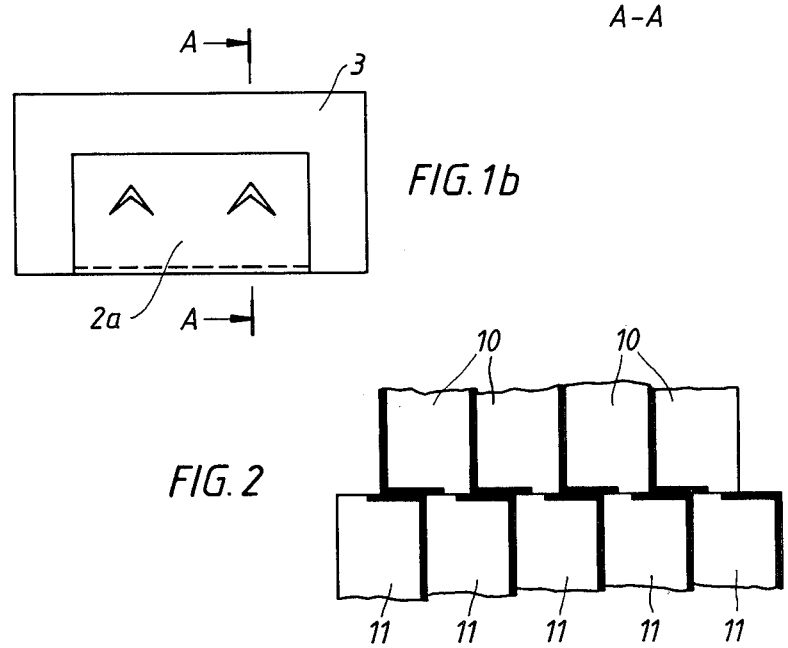
FIG. 2

DC ARC FURNACE COMPONENT

In a DC arc furnace the arc current is usually carried through the melt in the furnace hearth to the arcing electrode. One way to connect the current to the melt is by an electrically conductive hearth which contains the melt.

The Stenkvist et al U.S. Pat. No. 4,324,943 discloses a particularly satisfactory electrically conductive hearth for such an arc furnace, particularly the type of DC arc furnace used for the melt reduction of iron oxides where the melt is highly carbonaceous iron. This conductive hearth is formed by bricks layed to form a wall adapted to contain the melt and to be directly contacted by the melt, the bricks being laid on an electrically conductive layer connected with the DC power circuit which includes the arcing electrode. In one form the bricks, which are themselves essentially non-conductive, are preformed and fired and ready for contact by the melt and are shaped so that when laid a cluster of vertical passages is formed through which steel bars are inserted with their lower ends in electrical connection with the electrically conductive layer and their upper ends exposed so as to be contacted by the melt.

The above hearth construction has the advantage that the bricks can be preformed so that when laid in layers they form the passageways for the steel bars, and because during manufacture they are free from the steel bars, the bricks can be fired at very high temperatures such as are used in the case of premium-quality high-fired bricks. In addition, when laid to form passages, the bricks can be in direct contact with each other so as to form a wall into which the melt cannot penetrate to lift and float the bricks, although the steel bars subsequently inserted in the passages of the laid bricks do themselves melt, possibly down through the first layer of the bricks. Brick flotation does not occur, because excepting for the steel bars, the bricks are otherwise in surface-to-surface contact. Also, it is possible to use refractory cement between the bricks for better sealing and mechanical connection from brick-to-brick.

The Stenkvist et al patent suggests that as an alternate to the shaped and fired bricks and subsequently inserted steel bars, commercially available metal-cased refractory bricks be used, relying on the casings to carry the electric current to the melt from the conductive layer underneath the bricks. Such bricks are fired after the refractory part is encased and have the disadvantage that the firing cannot be above the melting temperature of the metal cases which are normally sheet steel. Another disadvantage is that when a hearth is made of such commercially available metal-cased refractory bricks, the cases completely separate the refractory bricks from each other so that when the cases become molten, the melt carried by the brick hearth can penetrate down through at least the first or top layer of bricks so that the bricks loosen and float upwardly on the melt with destructive effects on the hearth. The use of refractory cement between metal-cased bricks is impractical, and in any event, plainly useless to prevent the loss of the brick interconnections.

It follows that although metal-cased bricks may be easier to lay when constructing a DC arc furnace conductive hearth, than the shaped bricks which must be laid with greater care to form the vertical passages for the steel bars, the mentioned disadvantages mitigate against their use. Incidentally, the shaped bricks have longitudinal grooves formed in at least one of their sides and which cooperate with the grooves of mutually adjacent bricks to form the bar passages, therefore requiring relatively careful laying to provide straight passages.

The object of the present invention is to provide the security and long life obtained from the high-fired shaped bricks, together with the easier laying of the metal-cased bricks, when laying the hearth of the Stenkvist et al patent.

As a summary of this invention, a brick is molded with a groove extending along one of its wide sides and partially over portions of its ends and spaced from the edges of the brick so as to leave portions of the brick between the groove and edges free to abut the corresponding portions of a corresponding brick when laid to form a brickwork wall. The brick can have the shape and dimensions of the commercial metal-cased brick, for example. However, as molded and green, it does not have any sheet metal component and, therefore, can be fired at the high temperatures used for premium-quality high-fired bricks; in other words, temperatures substantially above the melting temperature of steel.

Only after firing, a sheet metal steel strap is placed in the groove and mechanically or adhesively fixed in place, the groove being proportioned in depth so that the outer surface of the strap is flush with the brick surfaces in which the groove is formed.

The result is that these new bricks can be laid to form the hearth wall directly contacted by the melt with the metal straps interconnecting by proper orientation of the bricks, so as to carry the electric current from the conductive lower layer to the melt, while at the same time the brick portions free from the staps can directly intercontact so that the melt cannot penetrate between them and result in brick flotation even if the straps melt. Refractory cement can be used between the interfacing brick portions which are free from the steel straps. Usually more than two layers of bricks are required, the portions of the straps extending partially over the brick ends being mutually more or less registered to provide electrical interconnection. Otherwise, careful brick laying is not particularly required and the bricks mutually intercontact throughout their portions free from the straps.

The accompanying drawings illustrate the foregoing summarized principles of this invention, the various views being as follows:

FIG. 1a is an elevation showing the wide side of the brick having the groove containing the metal strip;

FIG. 1b shows one of the ends of the brick over which the grooves and strap partially extend;

FIG. 1c is a cross section taken vertically through FIG. 1a; and

FIG. 2 schematically shows how the new bricks can be laid to establish electrical connection between the bottom and top of a hearth made from the bricks.

In the above drawings the brick 1 is shown with the typical rectangular brick contour, with the steel strap 2 extending for the length of one of the brick's side and partly over portions of its ends as shown at 2a and 2b in FIG. 1c, FIG. 1b showing particularly well the portion 2a which extends over one of the ends, the corresponding strap portion at the other end being the same. FIG. 1b shows how the outer face of the strap 2 is flush with the adjacent surfaces of the brick, the strap being in the groove 1c formed in the brick's surface.

The strap in the groove leaves extensive surfaces of the brick free from the strap, as shown at 3, 4, 5 and 6. In other words, the groove and strap are spaced from the edges of the brick so as to leave the edge portions 3, 4, 5 and 6 exposed and free to abut the corresponding portions of a corresponding brick when laid to form the brickwork hearth of the Stenkvist et al patent.

In the illustrated example, the ends of the brick are formed with indents 7 and the bent-over ends of the strap are formed with inwardly extending prongs 8 which fit in these indents so as to mechanically hold the strap in the groove. It may be possible to adhesively secure the strap in the groove because when laid with other corresponding bricks, the strap is held in its proper position. For shipment and laying of the bricks, the strap should be secured in position.

The strap has been referred to as being steel because the melt which directly contacts the hearth made from the bricks is ordinarily carbonaceous iron or other type of ferrous melt. The strap metal should be compatible with the composition of the melt involved.

The metal strap 2 should be flush with its bounding brick surfaces. If the strap outer surface is below the brick surfaces, it cannot make adequate electrical contact with the straps of other bricks; and if it is higher, the strap will prevent the brick surfaces 3, 4, 5 and 6 from contacting the corresponding brick surfaces of other bricks. The gauge and width of the strap depends on the current which must be carried with the understanding that the strap must leave substantial portions of the brick surfaces 3, 4, 5 and 6 exposed.

Using any suitable, moldable refractory composition, the brick itself is molded with its groove 1c and indents or depressions 7 with the understanding that these indents are omitted if the strap is to be adhesively fixed to the brick, although both mechanical and adhesive fixation together is possible. The brick is fired prior to application of the strap and, therefore, may be fired at temperatures above the melting temperature of the steel strap.

This new brick may be considered as being a partially metal-cased brick, but with the advantage that the brick itself may be fired without the metal component. When these bricks are used as components of the brick hearth to replace those of the Stenkvist et al patent, but otherwise for the same purpose, they are laid as illustrated by FIG. 2 of the drawings. Here it can be seen that the upper layer of the bricks 10 and the lower layer of the bricks 11 are laid with their bent-over end portions 2a and 2b pointing in opposite directions so that the metallic parts intercontact while the brick surfaces corresponding to those shown at 3 and 4 in FIG. 1c are in direct contact with each other. Although not shown by FIG. 2, in the horizontal cross section direction, the surfaces 5 and 6 of the respective bricks all intercontact. Metal surfaces abut metal surfaces in all cases, and in all cases what can be premium-quality, high-fired brick portions are in contact with each other. If necessary, a refractory cement can be used to seal the brick-to-brick surfaces.

When these bricks are used as components of a DC arc furnace electrically conductive hearth in direct contact with the hearth's melt, brick flotation will not result even if the straps or partial metal cases of the bricks in the upper layer, as at 10 in FIG. 2, become molten, because the exposed brick portions are always in contact with those of adjacent bricks. Precision laying of the bricks is not nearly so mandatory as in the case of the high-fired bricks of the Stenkvist et al patent, while at the same time the advantages of that patent are retained.

I claim:

1. A DC arc furnace hearth at least partly comprising a brickwork formed by partially metal-cased bricks each having a metal casing covering only a part of the brick's surface, the surface having a recess formed in it and in which the casing is positioned flush with the surface so as to leave the balance of the brick's surface uncased, the bricks being laid so that throughout the brickwork the metal casings intercontact so as to cause the brickwork to be electrically conductive from its top to its bottom, and so that the bricks' uncased surfaces also intercontact so as to support the bricks in their layed positions in the event the metal casings become molten.

2. The hearth of claim 1 in which said recess in each brick is in the form of a groove which extends along one side of the brick and partially along the brick's top and bottom and the groove is throughout its extend laterally spaced from the edges of the brick, and said casing is in the form of a metal strap positioned in and fitting the groove flush with the balance of the brick's surface, the strap having bent-over ends fitting the groove extending in the brick's top and bottom.

3. The hearth of claim 2 in which said groove extending in the brick's top and bottom has indents formed therein and the strap's said bent-over ends are formed with inwardly extending prongs which fit in the indents so as to mechanically hold the strap in the groove.

4. The hearth of claim 2 in which the bricks are layed so as to form at least two superimposed layers with said bent-over ends in one layer pointing in one direction and in the other layer pointing in an opposite direction.

* * * * *